US012675704B2

(12) United States Patent
Li et al.

(10) Patent No.: US 12,675,704 B2
(45) Date of Patent: Jul. 7, 2026

(54) MANAGING DATA STORED IN A CACHE USING A REINFORCEMENT LEARNING AGENT

(71) Applicant: ALIBABA GROUP HOLDING LIMITED, George Town (KY)

(72) Inventors: Haoran Li, Shanghai (CN); Pengcheng Li, Sunnyvale, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 836 days.

(21) Appl. No.: 18/081,340

(22) Filed: Dec. 14, 2022

(65) Prior Publication Data

US 2023/0121843 A1     Apr. 20, 2023

Related U.S. Application Data

(63) Continuation of application No. PCT/CN2020/096130, filed on Jun. 15, 2020.

(51) Int. Cl.
*G06Q 30/00* (2023.01)
*G06N 3/092* (2023.01)

(52) U.S. Cl.
CPC ......... *G06N 3/092* (2023.01); *G06F 2212/60* (2013.01)

(58) Field of Classification Search
None
See application file for complete search history.

(56) References Cited

U.S. PATENT DOCUMENTS 10,552,737 B2   2/2020   Seibold et al.
10,740,676 B2   8/2020   Durdanovic et al.

10,832,135 B2   11/2020   Ji et al.
10,929,503 B2   2/2021   Azizi et al.
11,030,528 B1   6/2021   Zhuo et al.
(Continued)

FOREIGN PATENT DOCUMENTS

CN   109660598 A   4/2019
CN   110651279 A   1/2020

OTHER PUBLICATIONS

Zhong et al., "A Deep Reinforcement Learning-Based Framework for Content Caching", 2018 52nd Annual Conference on Information Sciences and Systems (CISS), Dec. 31, 2018. (Year: 2018).*
(Continued)

*Primary Examiner* — Matthew T Sittner

(74) *Attorney, Agent, or Firm* — Sheppard Mullin Richter & Hampton LLP

(57) ABSTRACT

Managing data stored in a cache using a reinforcement learning agent may include: determining a set of current state observations with respect to a cache, wherein the set of current state observations is determined based on historical cache accesses to the cache; inputting the set of current state observations into an actor network of a reinforcement learning (RL) agent to obtain an action output by the actor network, wherein the RL agent is configured to manage data stored at the cache; inputting the set of current state observations and the action into a critic network of the RL agent to obtain a score corresponding to the action from the critic network; causing the RL agent to perform the action with respect to managing the data stored at the cache; using the score to update the actor network; and using a reward corresponding to the action to update the critic network.

18 Claims, 10 Drawing Sheets

(56) References Cited

U.S. PATENT DOCUMENTS

| | | | |
|---|---|---|---|
| 2004/0078402 A1* | 4/2004 | Butler | H04L 9/0869 |
| | | | 708/252 |
| 2011/0246411 A1* | 10/2011 | Laneman | G06N 5/04 |
| | | | 706/52 |
| 2016/0019303 A1 | 1/2016 | Littleford | |
| 2018/0307493 A1* | 10/2018 | Tene | G06F 9/3834 |
| 2019/0057308 A1 | 2/2019 | Cho et al. | |
| 2019/0061147 A1 | 2/2019 | Luciw | |
| 2019/0080238 A1 | 3/2019 | Wang et al. | |
| 2019/0279089 A1 | 9/2019 | Wang | |
| 2019/0362235 A1 | 11/2019 | Xu et al. | |
| 2020/0104717 A1 | 4/2020 | Alistarh | |
| 2020/0311549 A1 | 10/2020 | Wang et al. | |
| 2021/0027166 A1 | 1/2021 | Gorokhov et al. | |
| 2021/0073643 A1 | 3/2021 | Partovi Nia et al. | |
| 2021/0081798 A1 | 3/2021 | Cho et al. | |
| 2021/0097393 A1 | 4/2021 | Wang et al. | |
| 2021/0150363 A1 | 5/2021 | Yang et al. | |
| 2021/0264278 A1 | 8/2021 | Liu et al. | |
| 2021/0287092 A1 | 9/2021 | Nie et al. | |
| 2022/0012593 A1 | 1/2022 | Huang et al. | |
| 2024/0013090 A1* | 1/2024 | Kanazawa | G06N 3/092 |

OTHER PUBLICATIONS

Z. Tian, Z. Wang, J. Xu, H. Li, p. Yang and R. K. V. Maeda, "Collaborative Power Management Through Knowledge Sharing Among Multiple Devices," in IEEE Transactions on Computer-Aided Design of Integrated Circuits and Systems, vol. 38, No. 7, pp. 1203-1215, Jul. 2019 (Year: 2019).*

First Search for Chinese Application No. 202080099634.0 mailed on May 6, 2023.

Written Opinion of the International Searching Authority and International Search Report for PCT Application No. PCT/CN2020/096130 mailed on Mar. 11, 2021.

Zhong et al., "A Deep Reinforcement Learning-Based Framework for Content Caching", 2018 52nd Annual Conference on Information Sciences and Systems (CISS), Dec. 31, 2018.

Thar et al., "A Deep Learning Model Generation Framework for Virtualized Multi-Access Edge Cache Management", IEEE, May 24, 2019.

* cited by examiner

400

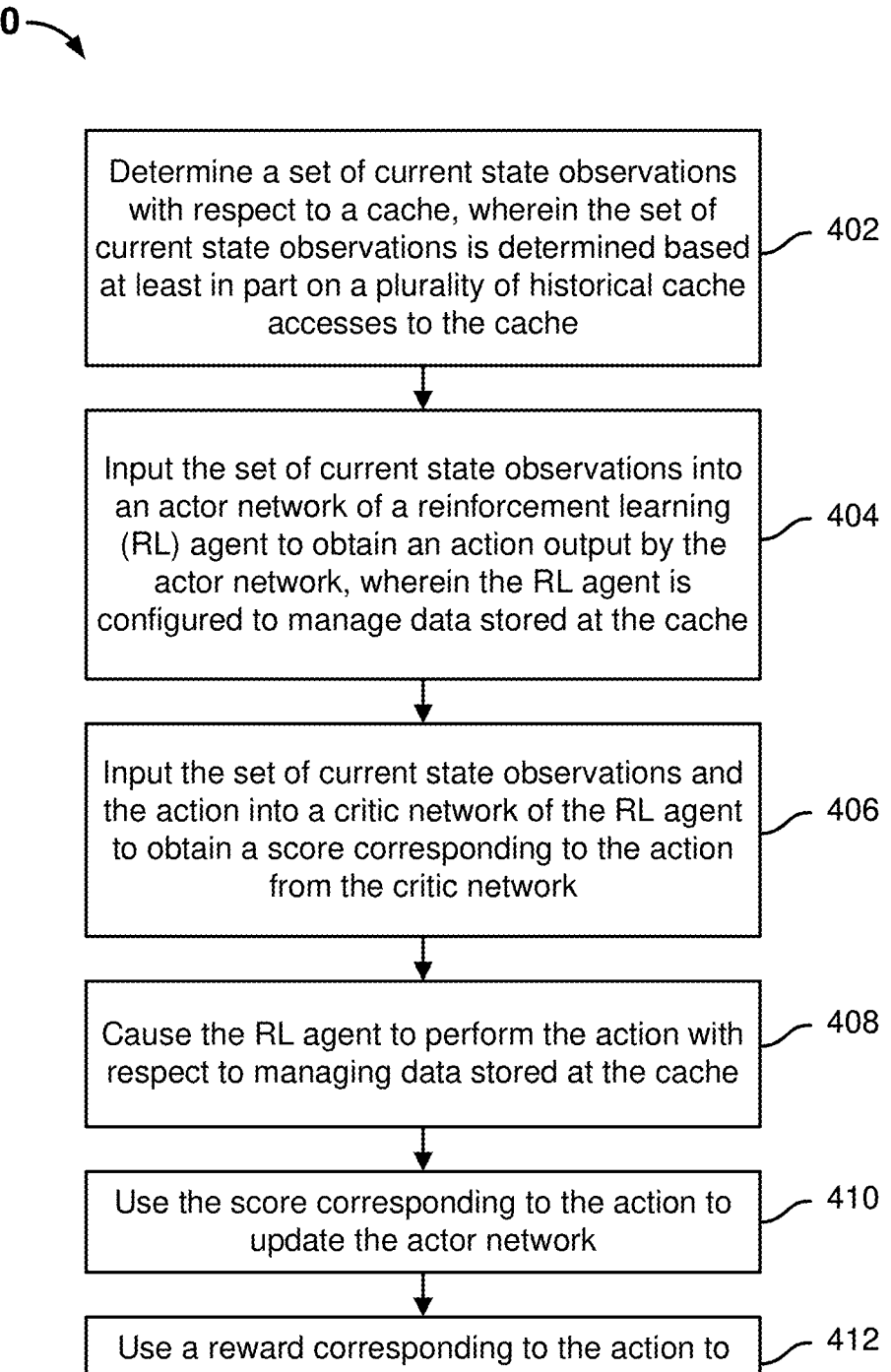

Determine a set of current state observations with respect to a cache, wherein the set of current state observations is determined based at least in part on a plurality of historical cache accesses to the cache — 402

Input the set of current state observations into an actor network of a reinforcement learning (RL) agent to obtain an action output by the actor network, wherein the RL agent is configured to manage data stored at the cache — 404

Input the set of current state observations and the action into a critic network of the RL agent to obtain a score corresponding to the action from the critic network — 406

Cause the RL agent to perform the action with respect to managing data stored at the cache — 408

Use the score corresponding to the action to update the actor network — 410

Use a reward corresponding to the action to update the critic network — 412

| Current History Table | |
|---|---|
| Cache Access ID 1 | Access Related Information |
| Cache Access ID 2 | Access Related Information |
| Cache Access ID 3 | Access Related Information |
| Cache Access ID 4 | Access Related Information |
| ... | ... |
| ... | ... |
| Cache Access ID N | Access Related Information |

Start

Determine an event related to a cache ⎯ 702

706

Trigger RL agent to perform action? ⎯ 704

Yes

Perform an action associated with management of data stored in the cache

No

No

Stop? ⎯ 708

Yes

End

900

Current State Observations (S(t))

Next State Observations (S(t+1))

Action (A(t))

Reward (R(t))

1000

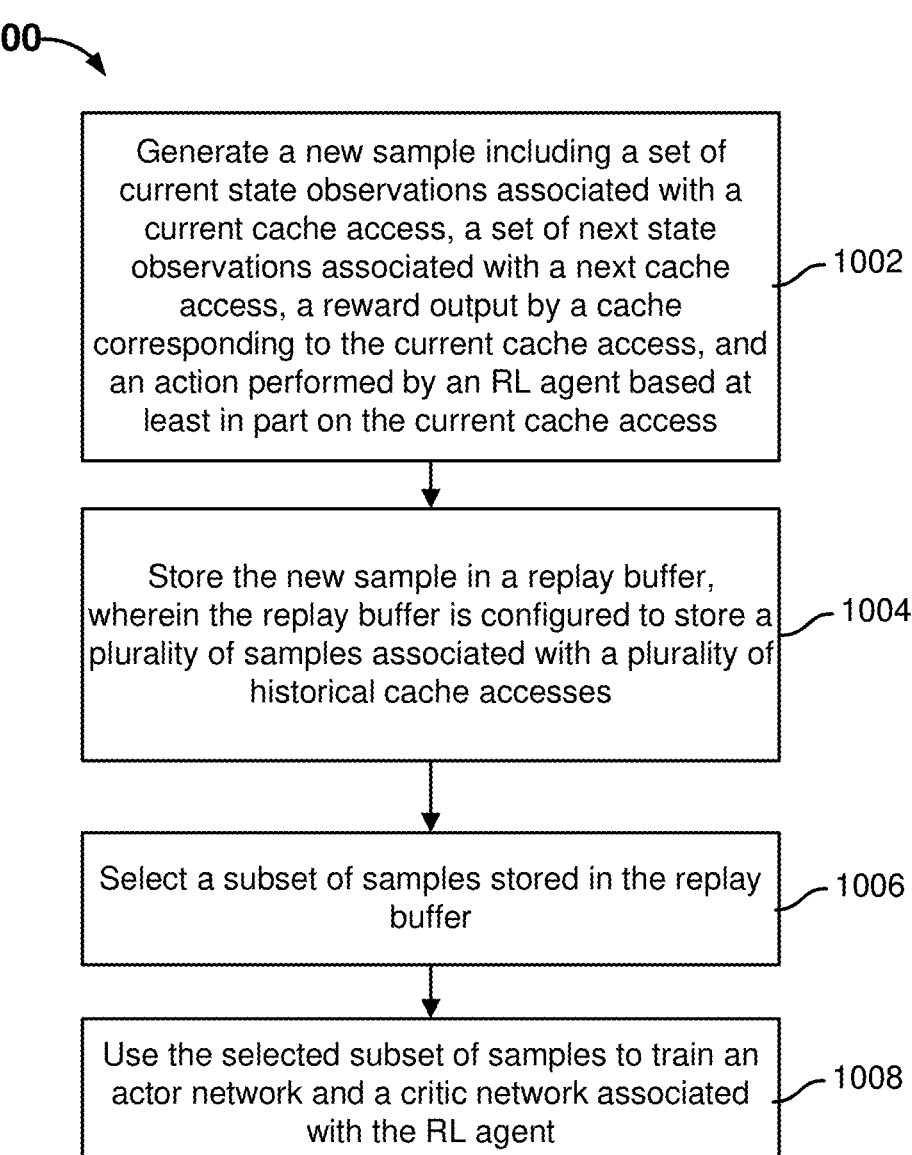

Generate a new sample including a set of current state observations associated with a current cache access, a set of next state observations associated with a next cache access, a reward output by a cache corresponding to the current cache access, and an action performed by an RL agent based at least in part on the current cache access ⟋ 1002

Store the new sample in a replay buffer, wherein the replay buffer is configured to store a plurality of samples associated with a plurality of historical cache accesses ⟋ 1004

Select a subset of samples stored in the replay buffer ⟋ 1006

Use the selected subset of samples to train an actor network and a critic network associated with the RL agent ⟋ 1008

FIG. 10

MANAGING DATA STORED IN A CACHE USING A REINFORCEMENT LEARNING AGENT

CROSS REFERENCE TO RELATED APPLICATION

This application is a continuation of PCT/CN2020/096130 filed on Jun. 15, 2020 and titled "MANAGING DATA STORED IN A CACHE USING A REINFORCE-MENT LEARNING AGENT," the content of which is hereby incorporated by reference in its entirety.

BACKGROUND

Hierarchical memory realizes tradeoffs between latency and storage capability. However, a cache can speed up computing systems by utilizing the data locality in the program and caching the frequently accessed items. For example, a 1% cache hit rate increase could result in 35% latency reduction in web servers. Improving caching per-formance with a limited cache size requires good prediction of future data reuse.

Currently, management of data stored at a cache is based on fixed rules. For example, fixed rules for when to store data in the cache and when to evict data that has already been stored in the cache were based on metrics such as how recently data in the cache had been used (e.g., LRU) and/or how frequently data in the cache had been used (e.g., LFU). However, such fixed policies for managing data stored at a cache are not flexible for different cache scenarios and/or potential changes in workloads to be serviced by the cache. As a result, fixed rules of data management at a cache could lead to a high cache miss ratio, which is undesirable.

BRIEF DESCRIPTION OF THE DRAWINGS

Various embodiments of the disclosure are disclosed in the following detailed description and the accompanying drawings.

FIG. 4 is a flow diagram showing an embodiment of a process for managing data stored in a cache using a rein-forcement learning agent in accordance with some embodi-ments.

FIG. 5 is a diagram showing an example of a current history table in accordance with some embodiments.

FIG. 10 is a flow diagram showing an example of a process for training an RL agent for managing data stored in a cache environment in accordance with some embodiments.

DETAILED DESCRIPTION

Figure 1:
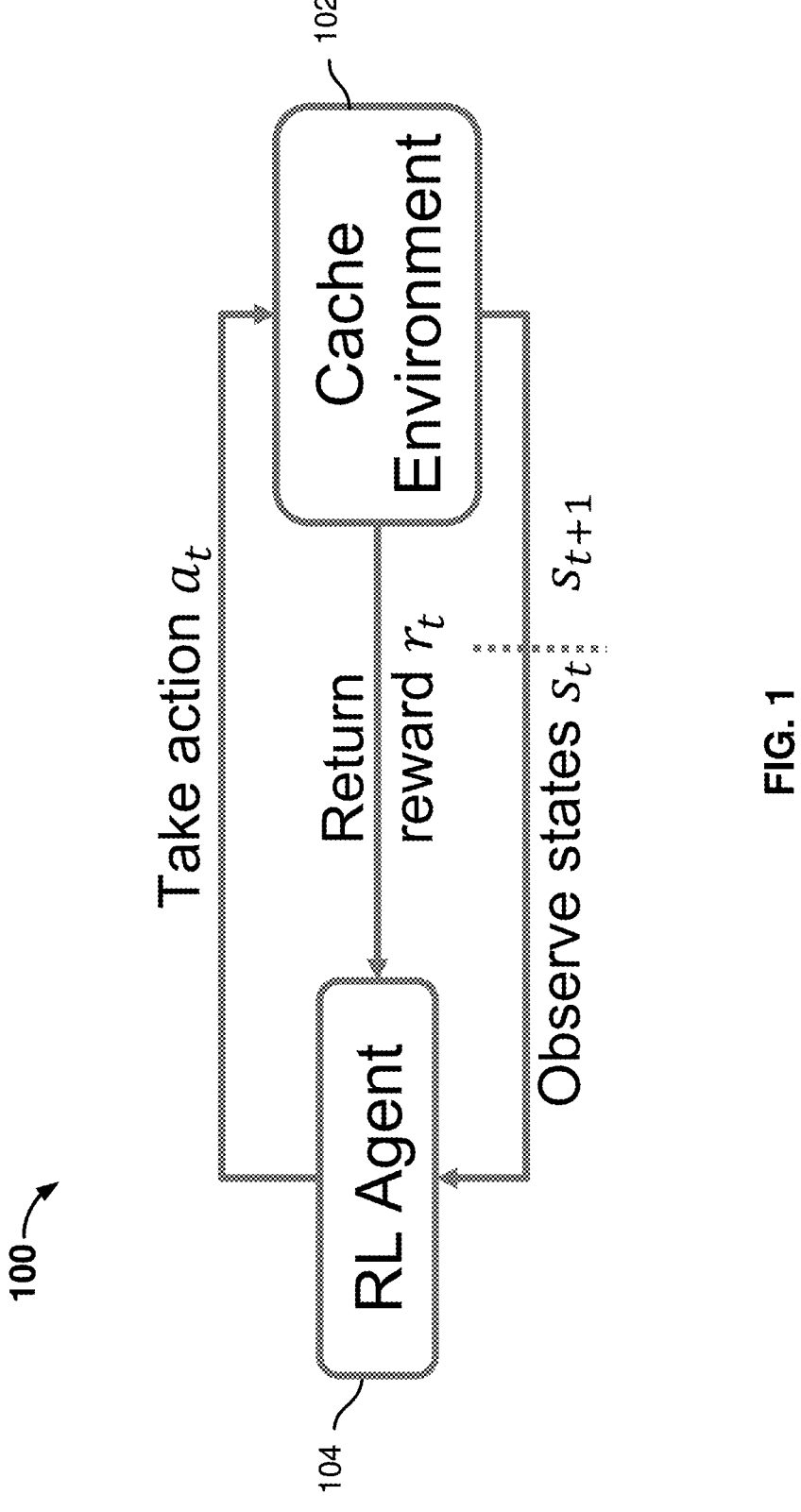
FIG. 1 is a diagram showing a schematic diagram of a DDPG RL agent in a cache environment in accordance with some embodiments.

The disclosure may be implemented in various ways, including as a process, an apparatus, a system, a composition of matter, a computer program product embodied on a computer readable storage medium, and/or a processor, such as a processor configured to execute instructions stored on and/or provided by a memory coupled to the processor. In this specification, these implementations, or any other form that the disclosure may take, may be referred to as tech-niques. In general, the order of the steps of disclosed processes may be altered within the scope of the disclosure. Unless stated otherwise, a component such as a processor or a memory described as being configured to perform a task may be implemented as a general component that is tem-porarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosure is provided below along with accompanying figures that illustrate the principles of the disclosure. The disclosure is described in connection with such embodi-ments, but the disclosure is not limited to any embodiment. The scope of the disclosure is limited only by the claims and the disclosure encompasses numerous alternatives, modifi-cations, and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

Embodiments of managing data stored in a cache using a reinforcement learning agent are described herein. A set of current state observations with respect to a cache is deter-mined. The set of current state observations is determined based at least in part on a plurality of historical cache accesses to the cache. In various embodiments, a cache is a component that stores data so that subsequent requests for data can be quickly serviced from the cache (e.g., as opposed to another storage from which data would be accessed more slowly relative to the cache). The set of current state observations is input into an actor neural network (which is sometimes referred to as simply an "actor network" or "actor net(s)") of a reinforcement learning (which is sometimes referred to simply as "RL") agent to obtain an action output by the actor network. The RL agent is configured to manage data stored at the cache. The set of current state observations and the action are input into a critic neural network (which is sometimes referred to as "critic network" or "critic net(s)") of the RL agent to obtain a score corresponding to the action from the critic network. The RL agent is caused to perform the action with respect to managing data stored at the cache. The score corresponding to the action is used to update the actor network. A reward corresponding to the action is used to update the critic network.

In some embodiments, the cache redundantly stores some data that is stored at a second-level auxiliary storage. For example, a cache includes a solid-state drive (SSD) and a second-level auxiliary storage includes a hard disk drive (HDD). In another example, a cache comprises a local content server (e.g., relative to the geolocation of a requestor) and a second-level auxiliary storage comprises a remote server (e.g., relative to the geolocation of a requestor). However, by virtue of the physical attributes of the cache (e.g., the storage medium) and/or the proximity of the cache to the requesting entity (e.g., device), a request for data that is stored in both the cache and the second-level auxiliary storage can be more quickly serviced by the cache. However, due to the limited storage capacity of the cache, not all data that is potentially requested can be stored at the cache. As will be described in further detail below, using a deep deterministic policy gradients (DDPG) RL agent to observe states of cache accesses over time will allow the DDPG RL agent to self-adapt over time to create desirable data management policies that accommodate different workloads of the cache.

FIG. 1 is a diagram showing a schematic diagram of a DDPG RL agent in a cache environment in accordance with some embodiments. Reinforcement learning is a type of machine learning in which an (e.g., software) agent learns to take actions based on observations on an environment in order to maximize a cumulative reward that is output by the environment as a result of the actions taken. Unlike supervised learning, RL does not require labelled input and output pairs for training. RL makes multiple steps/actions over time and correlates immediate actions with relayed returns/rewards to obtain a policy of maximizing a complex objective. In the DDPG technique of RL, the actor-critic method is used and it includes two models:

Critic model: The critic model measures how good an action taken by the RL agent is by outputting a Q(a) score based on the input action for a given set of state observations. The critic model is value-based.

Actor model: The actor model selects an action for a set of state observations. The actor model also updates its policy parameters (e.g., neural network weights) based on the Q(a) score received from the critic model and will apply the updated policy parameters to select a subsequent action for a subsequent set of state observations. The actor model is policy-based.

In various embodiments, the RL agent includes both the actor model and the critic model, each of which can be implemented by a corresponding (e.g., neural) network. In various embodiments, the RL agent is configured to manage data that is stored at the cache. For example, managing data that is stored at the cache includes data replacement policies at the cache. Specifically, data replacement policies at the cache include policies that determine when to evict which data (e.g., associated with specific data item IDs and/or data items stored at which addresses in the cache storage) that is already stored at the cache storage in anticipation of storing new data to replace the evicted data at the limited capacity cache storage.

Referring to the diagram of FIG. 1, system 100 includes cache environment 102 and RL agent 104. Cache environment 102 includes a cache storage that is configured to store data that is expected to be quickly and/or frequently accessible to requestors. In some embodiments, the data that is stored in the cache storage was first retrieved from a second level auxiliary storage, which provides slower access than the cache storage due to, for example, a difference in their storage media and/or a difference in their geographic location relative to the location of the requestor. Requestors (e.g., a device, an application) for data will send a request (a cache access) to cache environment 102 and cache environment 102 will respond to the cache access. Cache environment 102 is configured to respond to the cache access by checking whether the data item that is requested by the cache access is stored in the cache storage. If the requested data item is stored in the cache storage, then there is a "cache hit" and cache environment 102 is configured to retrieve the requested data item from the cache storage and return it to the requestor. If the requested data item is not stored in the cache storage, then there is a "cache miss" and cache environment 102 is configured to retrieve the requested data item from a second-level auxiliary storage (not shown) and return it to the requestor. In some embodiments, cache environment 102 is configured to store/add the data item retrieved from the second-level auxiliary storage in the cache storage or return it directly to the requestor without storing it in the cache storage (a bypass).

RL agent 104 includes an actor network and a critic network (not shown). RL agent 104 is configured to take a set of current state observations ($s_t$) associated with each cache access that is received by cache environment 102. As will be described in further detail below, the set of current state observations corresponding to a current cache access comprises one or more values corresponding to one or more state definitions associated with historical cache accesses received at cache environment 102. The set of current state observations is input into RL agent 104 and RL agent 104 performs action ($a_t$) with respect to cache environment 102. In some embodiments, action ($a_t$) may comprise an action with respect to data replacement at the cache storage, including, for example, an output of when the data item requested by the current cache access is to be evicted from the cache storage, an output of the location at which the data item requested by the current cache access is to be stored at the cache storage, and/or an eviction of a particular data item from the cache. Cache environment 102 is configured to return a reward ($r_t$) to RL agent 104 based on how the cache access was responded to. In some embodiments, reward ($r_t$) comprises a value that is determined as a function of whether the cache access resulted in a cache hit, a cache miss, and/or whether an eviction occurred as a result of a cache miss (because the requested data item was retrieved from the second-level auxiliary storage and had replaced another data item that was in the cache storage). RL agent 104 uses the reward ($r_e$) to update its network to improve its policy in taking subsequent actions based on subsequent sets of state observations such as $s_{t+1}$. As a result of adapting to rewards given by cache environment 102, RL agent 104 is configured to tune the actions that it performs for sets of state observations that it makes with respect to cache environment 102 to ultimately improve the data management at the cache storage to result in a higher cache hit ratio. Further details of the DDPG actor network and critic network model of an RL agent will be described below.

Figure 2:
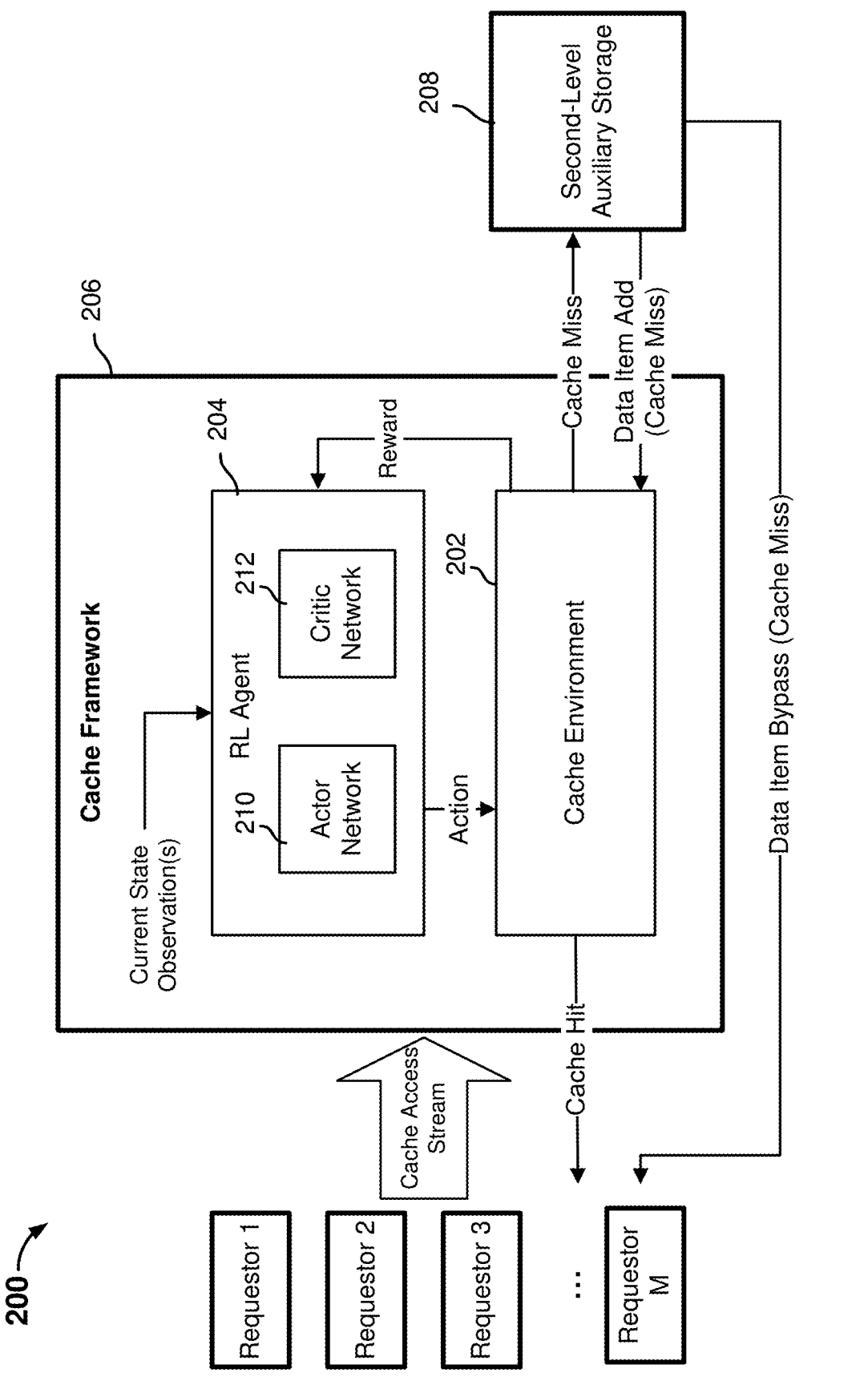
FIG. 2 is a diagram showing an example system for managing data stored in a cache using a reinforcement learning agent in accordance with some embodiments.

FIG. 2 is a diagram showing an example system for managing data stored in a cache using a reinforcement learning agent in accordance with some embodiments. In some embodiments, cache environment 102 of FIG. 1 can be implemented, at least in part, using cache environment 202 of FIG. 2. In some embodiments, RL agent 104 of FIG. 1 can be implemented, at least in part, using RL agent 204 of FIG. 2.

As shown in the example of FIG. 2, cache framework 206 includes RL agent 204 and cache environment 202. Cache environment 202 includes at least a cache storage (e.g., a memory) that is configured to store data items that are predicted to be queried (again) by requestors (such as Requestors 1, 2, 3, . . . , M). For example, cache environment 202 stores data that was originally created at and/or retrieved from second-level auxiliary storage 208. However, because of either, for example, a difference in storage media between the cache storage of cache environment 202 and second-level auxiliary storage 208 (e.g., the cache memory is a solid state drive (SSD) and second-level auxiliary storage 208 is a hard disk drive (HDD), which provides slower access than SSD) or a difference in proximity between the cache storage of cache environment 202 and second-level auxiliary storage 208 relative to the requestors (e.g., cache environment 202 is geographically closer to the requestors than second-level auxiliary storage 208), cache environment 202 is able to provide faster access to requests for data than second-level auxiliary storage 208. For example, second-level auxiliary storage 208 is a main memory to cache environment 102's cache memory or second-level auxiliary storage 208 is a remote content server to cache environment 102's local content cache.

Requestors 1, 2, 3, . . . , M are configured to request data items from cache framework 206. In various embodiments, a stream of requests for data items from the requestors is also referred to as a "cache access stream" and a single request for data item(s) is referred to as a "cache access." For example, each of requestors 1, 2, 3, . . . , M is a device or a software application. A request for a data item that is received at cache framework 206 is serviced by cache environment 202. Cache environment 202 is configured to determine whether the requested data item is already stored at the cache storage. In the event that the requested data item is already stored at the cache storage, cache environment 202 is configured to determine that there is a "cache hit" (or "data item hit") and then send the data item that was retrieved from cache environment 202 back to the requestor. However, in the event that the requested data item is not already stored at the cache storage, cache environment 202 is configured to determine that there is a "cache miss" and then query second-level auxiliary storage 208 for the requested data item. In some embodiments, RL agent 204 is configured to determine whether a "cache miss" data item that is to be queried from second-level auxiliary storage 208 should be obtained from second-level auxiliary storage 208 and stored at cache environment 202 (which is sometimes referred to as a "data item add") and also to return the newly added data item to the requestor, or whether second-level auxiliary storage 208 should instead directly return the queried data item to the requestor (which is sometimes referred to as a "data item bypass" because the data item is not stored in cache environment 202). For example, a data item associated with a cache miss that is expected to be requested again may be added to cache environment 202, whereas a data item associated with a cache miss that is not expected to be requested again may bypass cache environment 202.

Because the storage capacity of the cache storage of cache environment 202 is limited, as more (e.g., requested or prefetched) data items are determined to be stored at cache environment 202, some existing data items at cache environment 202 will need to be evicted (e.g., replaced by new data items or otherwise marked for deletion/reclamation) from cache environment 202. Managing which data items should be stored in cache environment 202 and also for how long before they are replaced by new data items and/or evicted from cache environment 202 will directly affect cache environment 202's cache hit ratio (the ratio of the number of cache hits to the total number of all cache accesses). To ensure a high cache hit ratio, which is desirable, RL agent 204 is used in cache framework 206 to provide a flexible and adaptive policy for determining which data items should be stored in cache environment 202 and also for how long before they are replaced by new data items and/or evicted from cache environment 202.

RL agent 204 is configured to provide a policy associated with managing data stored in cache environment 202. In various embodiments, a "policy" refers to a strategy of outputting an action to be taken by RL agent 204 itself (e.g., the action to be taken by RL agent 204 may also result in a change in caching policy to be performed by cache environment 202) for a given set of state observations associated with cache environment 202. RL agent 204 includes actor network 210 and critic network 212. In various embodiments, each of actor network 210 and critic network 212 is implemented using a separate, fully connected neural network. In some embodiments, actor network 210 and critic network 212 are implemented using deep deterministic policy gradient (DDPG) techniques of reinforcement learning. A first advantage of the DDPG technique is that it enables RL Agent 204 to learn continuous action values, which means, e.g., precise control over which data item should be evicted from cache environment 202. In comparison, some traditional techniques, i.e., classic Q-Learning, DQN, etc. can only realize discrete actions. A second advantage of the DDPG technique is that compared to traditional actor-critic techniques, DDPG adds additional features such as experience replay buffer and double networks (a target and an evaluation network for both the actor and the critic) to improve its learning stability and performance. How an actor network such as actor network 210 and a critic network such as critic network 212 interact with each other will be described further below in FIG. 3.

RL agent 204 takes as input, a set of current state observations regarding the current state of cache environment 202. In some embodiments, RL agent 204 obtains a set of state observations regarding the current state of cache environment 202 in response to a trigger event. Examples of a trigger event include when a new cache access is received from a requestor at cache framework 206 or when cache environment 202 determines a cache miss (in the course of servicing a cache access). The type(s) of trigger events that lead to RL agent 204 obtaining a set of current state observations as input are configurable. In various embodiments, a current state observation is a value that corresponds to a "state definition." In various embodiments, state definition(s) for which values are to be determined are configurable. For example, state definition(s) pertain to the recent storage/request patterns of the currently requested data item of the current cache access at cache environment 202. In some embodiments, each current state observation corresponding to a state definition is a value that is normalized on a $[0, 1]$ range for simplicity of training actor network 210 and critic network 212.

In response to the input of the set of current state observations regarding the current state of cache environment 202, RL agent 204 is configured to perform an action that RL agent 204 had determined based at least in part on the set of current state observations. In some embodiments, the action performed by RL agent 204 comprises an instruction to cache environment 202 with respect to managing data stored at cache environment 202. For example, the action performed by RL agent 204 may be an instruction to cache environment 202 to either evict a data item stored at cache environment 202 at the current time or at a later time. In another example, the action performed by RL agent 204 may be an instruction to cache environment 202 to store a newly added data item (that was retrieved from second-level auxiliary storage 208) at a particular set of addresses at cache environment 202. In yet another example, the action performed by RL agent 204 may be an instruction to cache environment 202 to return a data item that was retrieved from second-level auxiliary storage 208 as a result of a cache miss directly to the requestor and not store the data item at cache environment 202.

As a result of RL agent 204 performing the action, cache environment 202 is configured to send a reward (as a form of immediate feedback) back to RL agent 204. In some embodiments, the reward sent by cache environment 202 is a value that is determined as a function of whether a cache hit or a cache miss was determined by cache environment 202 in response to the current cache access. For example, the reward is 0 if cache environment 202 determined a cache miss in response to the current cache access and the reward is 1 if cache environment 202 determined a cache hit in response to the current cache access. RL agent 204 is configured to use the reward to update critic network 212 so that critic network 212 will be configured to better score subsequent actions to be performed by RL agent 204, as will be described in further detail below.

Figure 3:
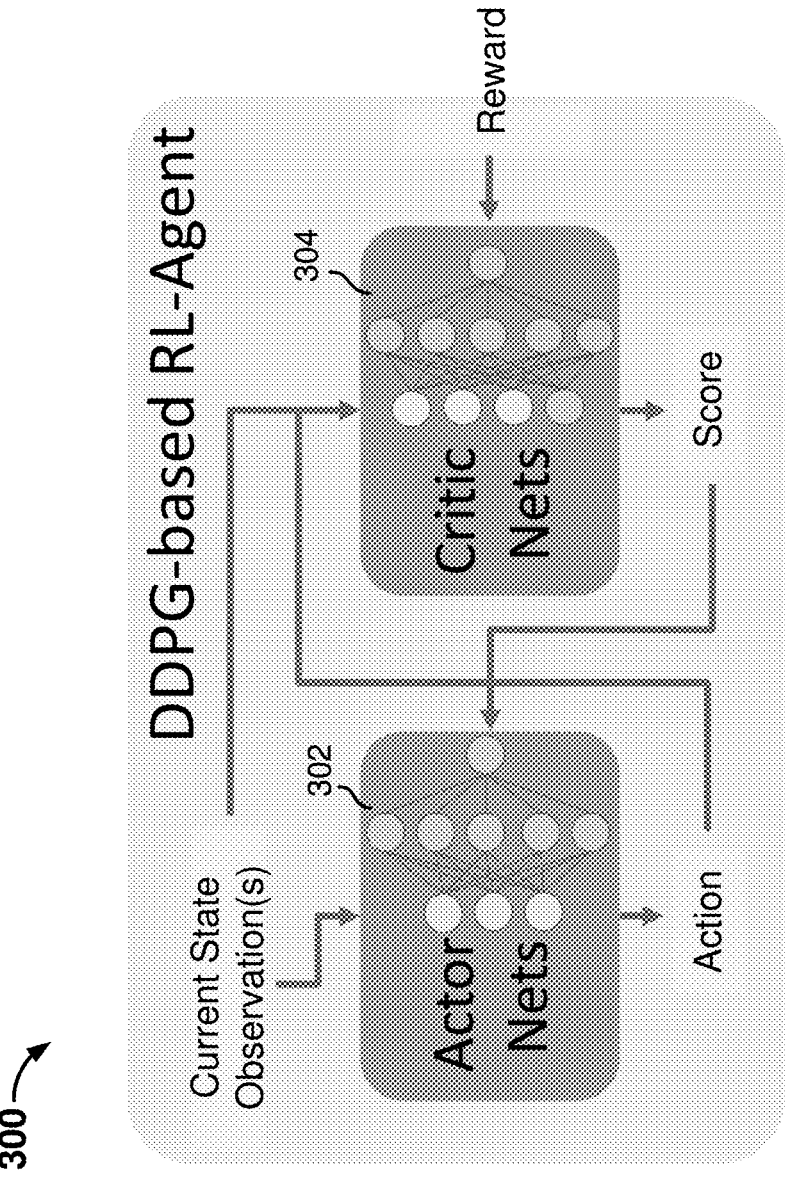
FIG. 3 is a diagram showing an example of an RL agent in accordance with some embodiments.

FIG. 3 is a diagram showing an example of an RL agent in accordance with some embodiments. In the example of FIG. 3, RL agent 300 is a DDPG-based RL agent. In some embodiments, RL agent 204 of FIG. 2 may be implemented, at least in part, using RL agent 300 of FIG. 3. As shown in FIG. 3, RL agent 300 includes two separate (e.g., fully connected) neural networks: actor nets 302 and critic nets 304.

Actor nets 302 is configured to receive as an input, current state observation(s) associated with a cache environment for which RL agent 300 is configured to manage the data stored therein. As mentioned above, a current state observation is a (e.g., normalized) value that is determined for a corresponding state definition (e.g., that is user configured). For example, each current state observation is determined as a function of recent storage/request patterns of the currently requested data item of a current cache access at the cache environment. In response to the input current state observation(s), actor nets 302 is configured to process the input through its various layers that define RL agent 300's current policy parameters and output an action based on the input. In various embodiments, the action comprises an instruction that is to be outputted by RL agent 300 and/or an instruction that is to be provided by RL agent 300 to the cache environment. For example, the instruction to the cache environment is to evict a data item from the cache environment at a specified time and/or to replace an existing data item in the cache environment with a data item that is newly added to the cache environment (e.g., from a second-level auxiliary storage).

Critic nets 304 is configured to receive an input, both the current state observations (that was input into actor nets 302) and also the action that is output by actor nets 302. In response to the input current state observation(s) and the action, actor nets 302 is configured to process the inputs through its various layers and output a score (e.g., a Q(a) value) corresponding to the action for the given current state observations. The score that is output by critic nets 304 can be thought of as a critique of the action that was output by actor nets 302. Critic nets 304 is configured to send the score to actor nets 302. Actor nets 302 is configured to perform backpropagation (e.g., a readjustment of weights) using the score (e.g., as a reference and/or error value) that it received from critic nets 304. By performing backpropagation using the score from critic nets 304, actor nets 302 is configured to output better actions (e.g., actions that will lead to higher cache hit ratios in the cache environment) for subsequent inputs of current state observations.

After the action is performed by RL agent 300 with respect to the cache environment, the cache environment is configured to provide a reward back to critic nets 304. As mentioned above, the reward sent by the cache environment is a value that is determined as a function of whether a cache hit or a cache miss was determined by the cache environment in response to the current cache access. For example, the reward is 0 if the cache environment determined a cache miss in response to the current cache access and the reward is 1 if the cache environment determined a cache hit in response to the current cache access. Critic nets 304 is configured to use the reward as a correction to update its layers so that critic nets 304 will be configured to better score subsequent actions that are output by actor nets 302. For example, critic nets 304 uses the reward to compute a reference score. A loss is then computed to see how much the predicted score (e.g., that score that critic nets 304 had determined based on the action output by actor nets 302) deviated from the reference score. Then the loss is used to update critic nets 304's parameters using backpropagation to make the future predicted score closer to the reference score.

FIG. 4 is a flow diagram showing an embodiment of a process for managing data stored in a cache using a reinforcement learning agent in accordance with some embodiments. In some embodiments, process 400 is implemented, at least in part, at a cache framework such as cache framework 206 of system 200 of FIG. 2.

At 402, a set of current state observations is determined with respect to a cache, wherein the set of current state observations is determined based at least in part on a plurality of historical cache accesses to the cache. Each current state observation is a value (e.g., that is normalized on a range of [0, 1]) that is determined for a corresponding state definition. As such, the set of current state observations is a set of values. In various embodiments, each state definition is configurable. In various embodiments, one or more state definitions are configurable for which current state observations should be determined. For example, each state definition relates to recent patterns/attributes of data items that have been stored at and/or accessed at the cache environment. In some embodiments, the cache is configured to store data that originates from another storage, such as a second-level auxiliary storage. Where the cache is configured to store data that originates from another storage, in some embodiments, the cache provides faster access than the other storage and is therefore queried first for requested data items.

The following are examples of state definitions, which for one or more thereof, current state observations may be determined:

1) The frequency of the current data item that is requested by a current cache access in a sliding window of recent accesses.

In some embodiments, information pertaining to a predetermined number, N (e.g., N=100), of recent cache accesses to the cache is maintained. This set of predetermined recent cache accesses may be referred to as a "sliding window" of recent cache accesses. For example, the sliding window can be implemented using a current history table. FIG. 5 is a diagram showing an example of a current history table in accordance with some embodiments. As shown in FIG. 5, current history table 500 stores N number of entries, where each entry stores information related to one of the Nth most recent accesses to the cache. For example, each entry in current history table 500 includes a Cache Access ID and corresponding access related information. Examples of access related information include the unique data item ID associated with the data item that was requested by that cache access, whether an eviction occurred at the cache for that cache access and the data item ID associated with the evicted data item, whether a cache hit occurred at the cache for that cache access, and whether a cache miss occurred at the cache for that cache access. Given that the window is sliding in nature, after N number of entries associated with N cache accesses have been added to the history table, the oldest entry (the entry associated with the oldest cache access) will be replaced by a new entry that is associated with the newest cache access. The sliding window may be implemented using various techniques, a current history table being only one example.

The sliding window can then be used to represent recent access patterns at the cache and also be used to determine current state observations corresponding to state definitions. In particular, the frequency of the current data item that is requested by a current cache access (e.g., a cache access that is being serviced by the cache when the current state observations are made) can be determined as the number of times that the data item ID corresponding to the current data item appears in the sliding window as the requested data item.

2) The number of evictions that had been performed on the current data item that is requested by a current cache access in a sliding window of recent accesses.

Because the sliding window (e.g., implemented a current history table such as the example shown in FIG. 5) can record when an eviction occurs in association with a recent cache access and also the data item ID corresponding to the evicted data item, the number of times that the data item ID corresponding to the current data item appears in the sliding window as the evicted data item can be determined.

3) The number of cache hits for the current data item that is requested by a current cache access in a sliding window of recent accesses.

Because the sliding window (e.g., implemented a current history table such as the example shown in FIG. 5) can record when a cache hit occurs in association with a recent cache access and also the data item ID corresponding to the requested data item, the number of times that the data item ID corresponding to the current data item appears in the sliding window as the requested data item can be determined.

4) The memory address offset delta of a current cache access relative to the memory.

The memory address in the second-level auxiliary storage of the current data item associated with the current cache access is determined. The memory address in the second-level auxiliary storage of the data item associated with the immediately previous cache access relative to the current cache access is determined. The absolute difference between the two memory addresses is determined as the memory address delta of a current cache access relative to the memory address of the immediately previous cache access.

5) The last reuse time of the current data item that is requested by a current cache access.

In some embodiments, the time at which each requested data item is found in the cache (in a cache hit) is recorded in a (e.g., hash) table. For example, the hash table may map each data item ID with the historical time(s), if any, that the corresponding data item had been retrieved from the cache. The "last reuse time" of the current data item is the recorded time at which the current data item associated with the current cache access was last obtained from the storage.

6) The second to last reuse time of the current data item that is requested by a current cache access.

The "second to last reuse time" of the current data item is the recorded time of the second to last (most recent) time at which the current data item associated with the current cache access was last obtained from the storage. For example, the "second to last reuse time" of the current data item may also be retrieved from a (e.g., hash) table that stores historical times at which data items had been accessed from the cache.

Returning to FIG. 4, at 404, the set of current state observations is input into an actor network of a reinforcement learning (RL) agent to obtain an action output by the actor network, wherein the RL agent is configured to manage data stored at the cache. In various embodiments, the RL agent is DDPG-based and therefore includes an actor network and a critic network that interact with each other to continuously improve the policy the actor network uses to provide management (e.g., replacement, eviction) of data that is stored at the cache to thereby increase and/or maintain a high cache hit ratio at the cache. The actor network takes the set of current state observations as input and in response, outputs an action to be taken by the RL agent with respect to managing the data stored at the cache. As mentioned above, examples of actions that are output by the actor network and then taken by the RL agent include providing instructions to the cache with respect to which data items to evict from the cache, when to evict a data item from the cache, and/or where (e.g., at which address(es)) to store a newly added data item to the cache.

At 406, the set of current state observations and the action are input into a critic network of the RL agent to obtain a score corresponding to the action from the critic network. The action that is output by the actor network is not only performed by the RL agent but is also input into the critic network along with the set of the current state observations. Using the action and the set of the current state observations as input, the critic network is configured to output a score (e.g., Q value) that critiques the action with respect to the current state observations. The score that is output by the critic network reflects the critic network's long-term value that the action is expected to result in at the cache. The score (e.g., Q Value) is a continuous value (i.e., 0.1234). The score represents how good the action is at certain state observations. For example, for the critic network, the inputs are the vector of state observation values plus the action value given by the actor network, and the output is the Q value representing the score. The critic network computes the Q Value using forward propagation.

At 408, the RL agent is caused to perform the action with respect to managing data stored at the cache. Examples of the action to be performed by the RL agent, in some embodiments, include instructing the cache to replace and/or evict data that is already stored in the cache at the current or a later time and instructing the cache to store newly added data items at a particular location (e.g., address) of the cache.

In a first specific example, the action that is output by the actor network and performed by the RL agent is the instruction of when the current data item associated with a current cache access should be evicted from the cache. For example, to enforce such instructions, a data structure can be generated to store data item IDs and the corresponding times at which the RL agent had indicated that the corresponding data items are to be evicted from the cache. The data item IDs in the data structure may be ranked (e.g., based on their corresponding eviction times). This data structure may be referred to by the RL agent and/or cache to perform actual evictions at the cache. For example, if the current time matches the eviction time of a data item for which a data item ID is stored in the data structure, then that data item is found in the cache and then evicted (e.g., immediately deleted/overwritten or marked for deletion/reclamation).

In a second specific example, the action that is output by the actor network and performed by the RL agent is the instruction of which location (e.g., address/offset) in the cache a newly added data item (e.g., that is retrieved from a second-level auxiliary storage) is to be stored in the cache. To implement this action, the RL agent (or the cache in response to an instruction from the RL agent) is configured to immediately evict the data item currently stored at the determined location in the cache (if a data item had already been stored there) and then store the newly added data item at that location.

At 410, the score corresponding to the action is used to update the actor network. The score that is output by the critic network corresponding to the current action that was output by the actor network is used by the actor network to improve its output of subsequent actions in response to subsequent inputs of current state observations. In some embodiments, the actor network will use the score to perform backpropagation.

At 412, a reward corresponding to the action is used to update the critic network. In various embodiments, the reward comprises a value that is assigned to the result of the cache servicing a current cache access. The reward can be thought of as a feedback from the cache on the action taken by the RL agent. In some embodiments, the value is determined as a function of whether the current cache access resulted in a cache hit or a cache miss. For example, if the current cache access resulted in a cache hit, then the reward that is returned to the critic network is 1; if the current cache access resulted in a cache miss but no cache eviction is performed, then the reward that is returned to the critic network is 0; and if the current cache access resulted in a cache miss and also a cache eviction is performed, then the reward that is returned to the critic network is −1. The following is an example explanation for why different reward values can be assigned to a cache miss that results in a cache eviction and a cache miss that does not result in a cache eviction: Eviction entails that an already cached data item has to be deleted from the cache, which can potentially lead to slow fetch in the future if the evicted data item is requested again. However, a cache miss does not always result in cache eviction. For example, during the initial stage when the cache is not full, a data item that has never been requested before should be added in the cache but no eviction will occur. As such, different reward values can be assigned to a "cache miss without eviction" event rather than a "cache miss with eviction" event to avoid biasing the learning of the RL Agent based on the behavior of the cache when the cache is full.

Figure 6:
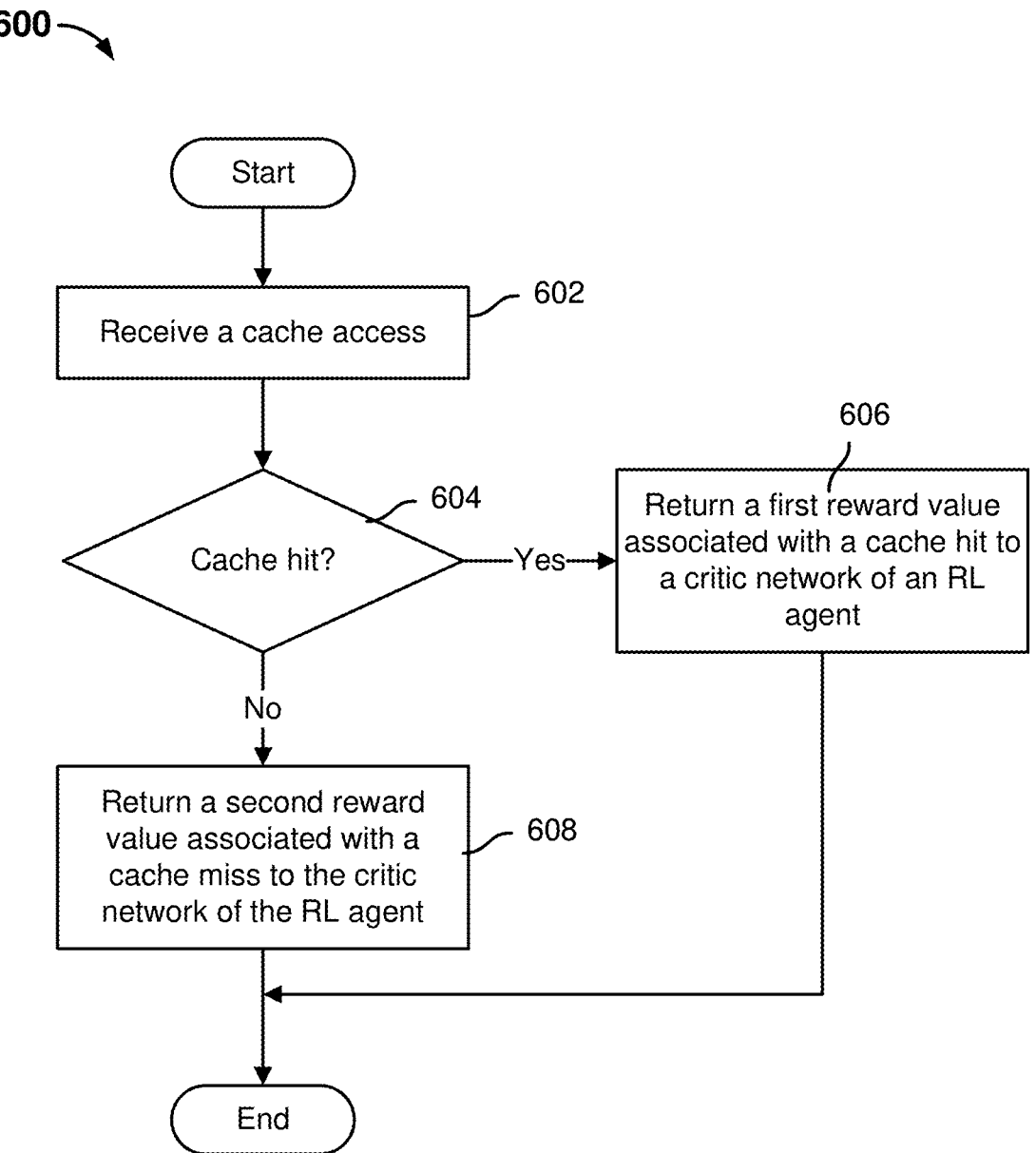
FIG. 6 is a flow diagram showing an example process by which a reward is determined for a critic network of an RL agent in accordance with some embodiments.

FIG. 6 is a flow diagram showing an example process by which a reward is determined for a critic network of an RL agent. In some embodiments, process 600 is implemented, at least in part, at a cache framework such as cache framework 206 of system 200 of FIG. 2.

At 602, a cache access is received. The cache access is received at a cache from a requestor requesting a data item that is potentially stored at the cache.

At 604, whether a cache hit has been determined for the cache access is determined. In the event that a cache hit has been determined for the cache access, control is transferred to 606. Otherwise, in the event that a cache miss has been determined for the cache access, control is transferred to 608. The cache is checked for whether the data item that is requested by the cache access exists in the cache. If the requested data item can be found in the cache, then a cache hit is determined. When a cache hit is determined, the requested data item is retrieved from the cache and then returned to the requestor. However, if the requested data cannot be found in the cache, then a cache miss is determined. In some embodiments, where a cache miss occurs, the request for the data item is passed along to a second-level auxiliary storage to determine whether the second-level auxiliary storage stores the requested data item. If the requested data item can be found in the second-level auxiliary storage, the requested data item is obtained from the second-level auxiliary storage and either added to the cache and/or bypasses the cache and is directly returned to the requestor.

At 606, a first reward value corresponding to the cache hit is returned to a critic network of an RL agent.

At 608, a second reward value corresponding to the cache miss is returned to at the critic network of the RL agent.

The reward values corresponding to a cache hit or a cache miss are configured to be different values to distinguish between the two scenarios. For example, the reward value corresponding to a cache hit is 1 and the reward value corresponding to a cache miss is 0. In some embodiments, there are two different reward values corresponding to a cache miss; one reward value (e.g., −1) for the case in which an eviction of an existing data item occurs at the cache and another reward value (e.g., 0) for the case in which an eviction does not occur at the cache.

Figure 7:
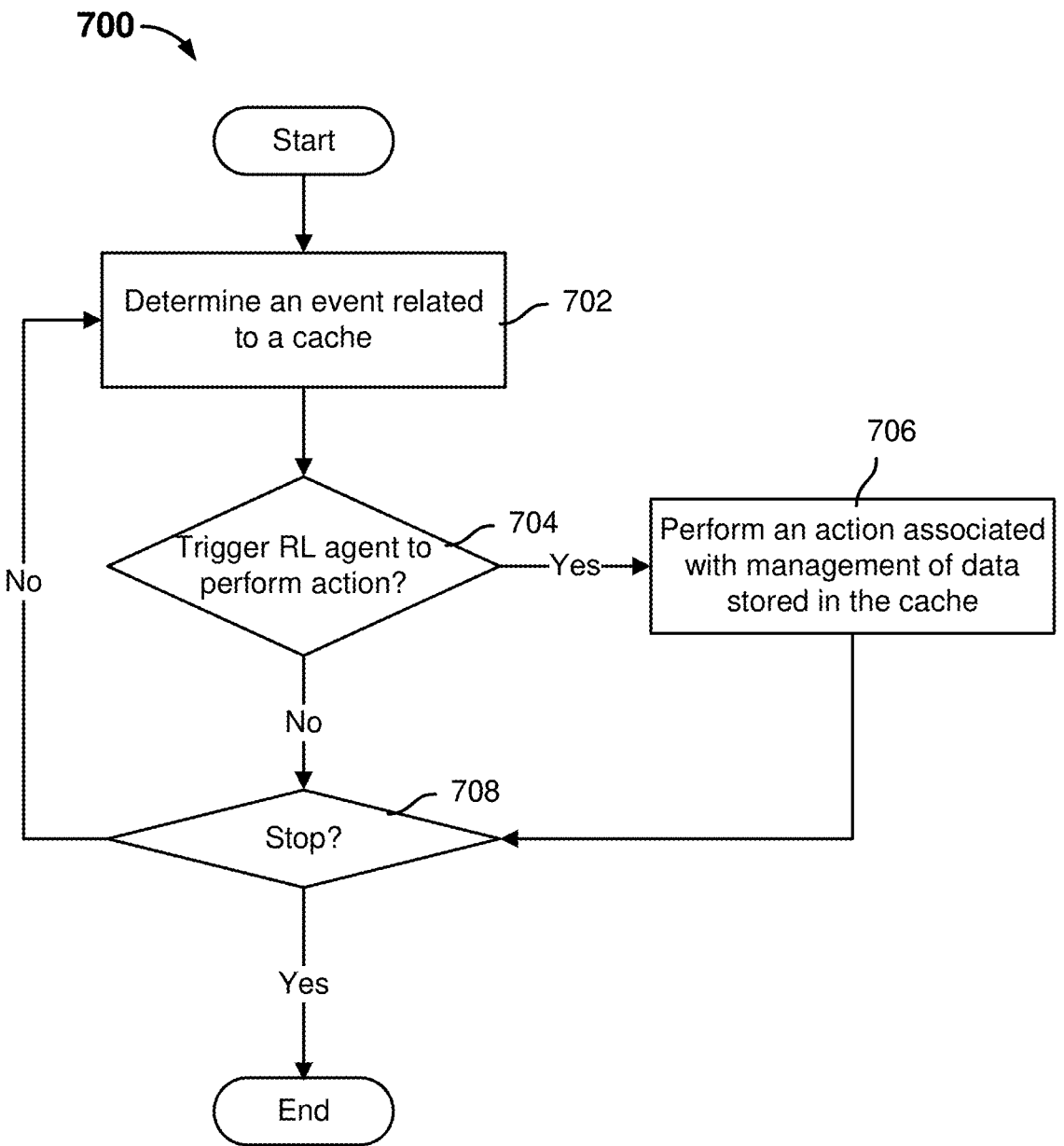
FIG. 7 is a flow diagram showing an example process by an RL agent in a cache environment that is triggered to take an action in accordance with some embodiments.

FIG. 7 is a flow diagram showing an example process by which an RL agent in a cache environment is triggered to take an action in accordance with some embodiments. In some embodiments, process 700 is implemented, at least in part, at a cache framework such as cache framework 206 of system 200 of FIG. 2.

Process 700 describes an example process in which an RL agent is triggered to determine and perform an action with respect to a cache in response to a triggering event.

At 702, an event related to a cache is determined. An "event related to a cache" can be any event that occurs with respect to the cache servicing cache accesses.

At 704, whether the event is to trigger an RL agent to perform an action with respect to the cache is determined. In the event that the RL agent is triggered to perform an action with respect to the cache, control is transferred to 706. Otherwise, in the event that the RL agent is not triggered to perform an action with respect to the cache, control is transferred to 708. In some embodiments, certain events related to a cache are configured to cause the RL agent to perform an action with respect to the cache. For example, events that may trigger the RL agent to perform an action with respect to the cache include when the cache determines a cache miss in response to a current cache access.

At 706, an action associated with management of data stored in the cache is performed. In various embodiments, step 706 is implemented at least in part using process 400 of FIG. 4.

At 708, whether process 700 should stop is determined. In the event that the process of determining whether an event triggers the RL agent to perform an action is determined to stop, process 700 ends. Otherwise, in the event that the process of determining whether an event triggers the RL agent to perform an action is determined to continue, control is returned to 702. For example, process 700 may be determined to stop when the RL agent is no longer used for managing the data stored at the cache and/or it is expected that the cache will no longer cater to diverse workloads.

Figure 8:
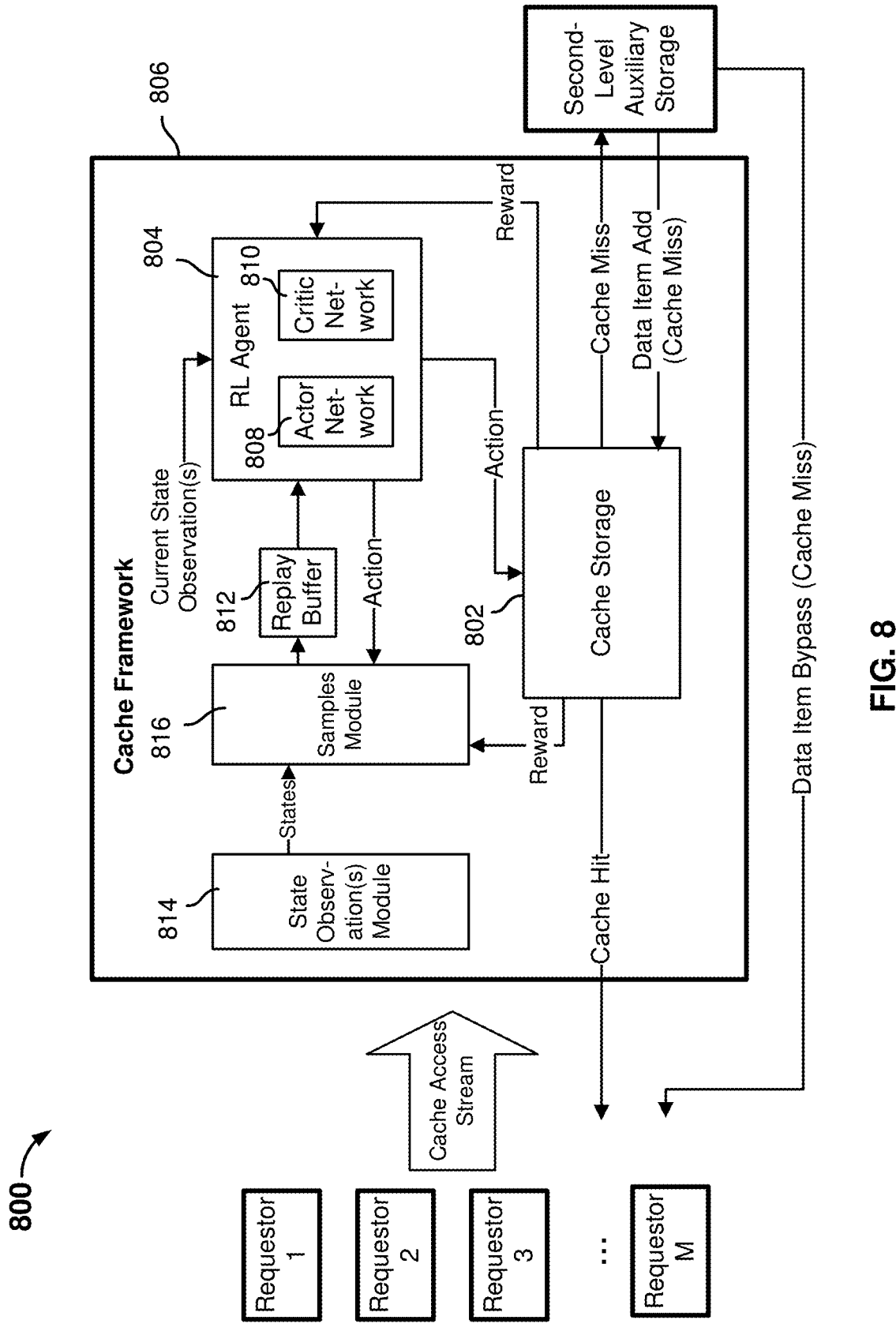
FIG. 8 is a diagram showing another example system for managing data stored in a cache using a reinforcement learning agent in accordance with some embodiments.

FIG. 8 is a diagram showing another example system for managing data stored in a cache using a reinforcement learning agent in accordance with some embodiments. In some embodiments, cache environment 102 of FIG. 1 can be implemented, at least in part, using cache storage 802 of FIG. 8. In some embodiments, RL agent 104 of FIG. 1 can be implemented, at least in part, using RL agent 804 of FIG. 8.

System 800 of FIG. 8 is similar to system 200 of FIG. 2 except that system 800 includes additional components such as state observation(s) module 814, samples module 816, and replay buffer 812. Additional components such as state observation(s) module 814, samples module 816, and replay buffer 812 are used to provide additional training to RL agent 804. State observation(s) module 814, which can be implemented using hardware and/or software, is configured to generate current state observations with respect to cache storage 802 (e.g., at each unit of time). Each set of current state observations that is generated by state observation(s) module 814 is then stored in samples module 816 as part of one or more samples, which will be described in further detail below. In some embodiments, sets of current state observations are both stored in samples module 816 and also input (e.g., in real-time) into actor network 808 (and critic network 810) to enable RL agent 804 to subsequently perform an action.

Figure 9:
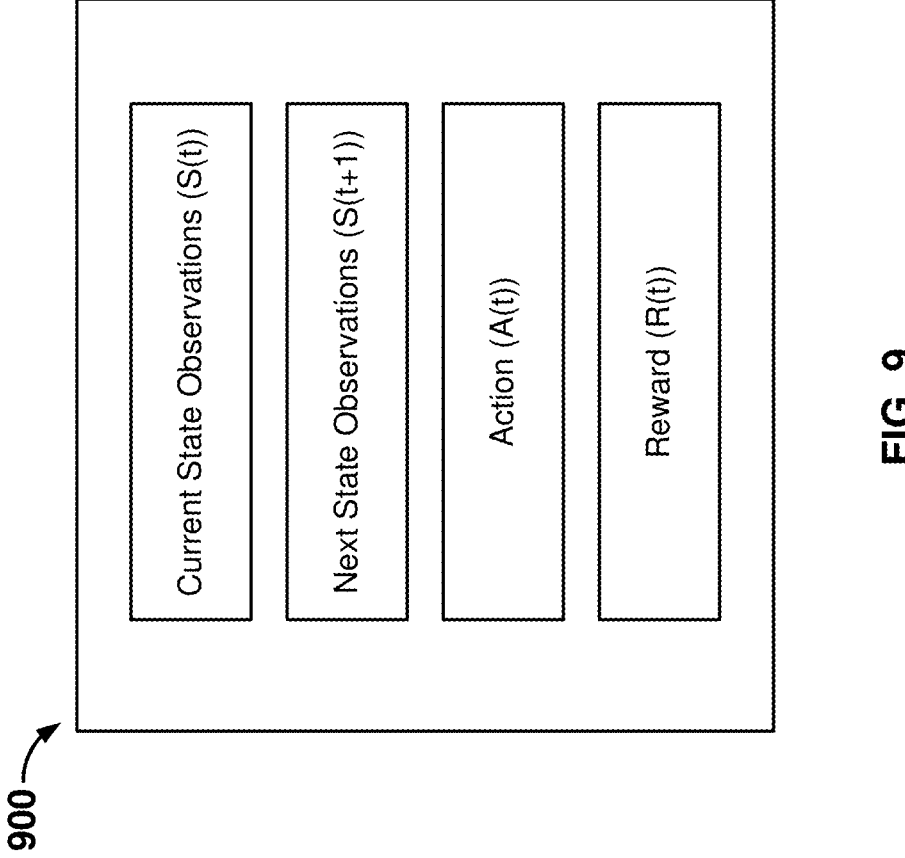
FIG. 9 is a diagram showing a sample that is generated and stored by a samples module such as samples module 816 of FIG. 8 in accordance with some embodiments.

Samples module 816, which may be implemented using software and/or hardware, receives sets of current state observations associated with respective units of time. Samples module 816 also receives actions associated with respective units of time from RL agent 804 after actor network 808 outputs the action. Additionally, samples module 816 receives rewards associated with respective units of time from cache storage 802 after cache storage 802 generates rewards in response to actions performed by RL agent 804. Samples module 816 is configured to generate samples based on the current state observations, actions, and rewards that it had received. FIG. 9 is a diagram showing a sample that is generated and stored by a samples module such as samples module 816 of FIG. 8 in accordance with some embodiments. In the example of FIG. 9, sample 900 includes the following fields: current state observations made at time t (S(t)), next state observations made at time t+1 (S(t+1)), the action taken by the RL agent at time t (A(t)), and the reward outputted by the cache in response to the action taken at time t (R(t)). Put another way, sample 900 stores historical state observations that were obtained at two adjacent units of time: the current unit of time and the next unit of time (t and t+1, respectively), as well as the action taken at the current unit of time, and the reward that evaluates the action taken at the current unit of time. In some embodiments, the current unit of time corresponds to a current cache access and the next unit of time corresponds to a next cache access.

Returning to FIG. 8, samples module 816 stores many samples (e.g., such as sample 900 of FIG. 9) and replay buffer 812 is configured to select a random subset (which is sometimes referred to as a "mini batch") of such samples to use to train RL agent 804. Samples are randomly selected by replay buffer 812 to use to train RL agent 804 so as to avoid the training from being biased based on temporality/chronology of samples if they were used in chronological order.

As shown in the example of FIG. 8, samples can be generated from historical transitions of state observations, corresponding historical actions, and corresponding historical rewards and used to continuously train and update actor network 808 and critic network 810 of RL agent 804 concurrently to the servicing of the cache access stream that is received at cache framework 806 so RL agent 804 can continuously improve its policy of managing data stored at cache storage 802.

FIG. 10 is a flow diagram showing an example of a process for training an RL agent for managing data stored in a cache environment in accordance with some embodiments. In some embodiments, process 1000 is implemented, at least in part, at a cache framework such as cache framework 806 of system 800 of FIG. 8.

At 1002, a new sample including a set of current state observations associated with a current cache access, a set of next state observations associated with a next cache access, a reward output by a cache corresponding to the current cache access, and an action performed by an RL agent based at least in part on the current cache access is generated. In some embodiments, the new sample may include fields and information as shown in sample 900 of FIG. 9, above.

At 1004, the new sample is stored in a replay buffer, wherein the replay buffer is configured to store a plurality of samples associated with a plurality of historical cache accesses.

At 1006, a subset of samples stored in the replay buffer is selected. A mini batch of samples is randomly selected from the replay buffer.

At 1008, the selected subset of samples is used to train an actor network and a critic network associated with the RL agent.

As mentioned above, a sample includes four elements: a vector of current state observations, the current action taken based on the current state observations, the reward for the current action and current state observations, and a vector of the next state observations.

In some embodiments, the actor network and the critic network can be running two simultaneous procedures: an inference procedure and a training procedure. During the inference procedure, the actor network will output an action for a given input vector of current state observations but neither actor nor critic networks are updated. For example, the output action and the input vector of state observations are used to generate new samples. During the training procedure, the actor and critic networks will not generate new samples, but the networks are updated using back propagation. Referring back to process 400 of FIG. 4, steps 402, 404, 408 may be performed during an inference procedure while steps 406, 410, and 412 may be performed during a training procedure using a mini batch of samples.

In the DDPG technique, both actor and critic networks will have two networks each: a main network and a target network. The target networks will be used in the inference procedure and generate new samples. The main networks are updated during the training procedure, and softly copied to the target network (incrementally). The main networks are incrementally copied to the target networks to allow for learning stability.

At each training epoch, a mini-batch of samples is randomly selected from replay buffers. For each sample in the mini-batch, during training, the critic network will apply forward propagation to the current state observations and the action from the sample to compute a predicted score (e.g., Q value). Then, the critic network will use the reward and the next state observations from the sample to compute a reference score (e.g., Q value). The critic network will then use the reference score and the predicted score to compute a loss. All the losses computed with all samples in the mini-batch will be averaged and used to update the parameters of the critic network using backpropagation.

For the actor network, during training, the predicted score (e.g., Q value) at the current state observations that is output by the critic network will be used to update the actor network using backpropagation in the direction of taking actions that maximize score in the future.

As described above, in accordance with at least some embodiments, a DDPG-based RL agent in a cache environment is continuously trained during runtime in parallel to the servicing of cache accesses to improve its management of data stored at the cache. As the RL agent learns and adapts to the current storage patterns and workload of its associated cache environment, the RL agent will take better actions with respect to data management, replacement, and/or eviction at the cache to ultimately improve the cache hit ratio of the cache.

Although the foregoing embodiments have been described in some detail for purposes of clarity of understanding, the disclosure is not limited to the details provided. There are many alternative ways of implementing the disclosure. The disclosed embodiments are illustrative and not restrictive.

The invention claimed is:

1. A system, comprising:
one or more processors; and
one or more memories coupled to the one or more processors and storing instructions that, when executed by the one or more processors, cause the system to perform operations comprising:
  receiving a cache access requesting a current data item identified by a data item identifier from a cache;
  determining, based at least in part on a plurality of historical cache accesses to the cache, a set of current states with respect to the cache;
  inputting the set of current states into an actor network of a reinforcement learning (RL) agent to obtain an action output by the actor network, wherein the RL agent is configured to manage data stored at the cache, and the action specifies an eviction time for the current data item;
  inputting the set of current states and the action into a critic network of the RL agent to obtain a score corresponding to the action from the critic network, for the RL agent to perform the action with respect to managing the data stored at the cache; and
  servicing the cache access according to the action by performing a cache-management operation that includes evicting the current data item from the cache when a system time reaches the eviction time and storing a replacement data item retrieved from a second-level auxiliary storage at a physical address in the cache determined by the action, thereby transforming a physical state of the cache;
  determining a reward corresponding to the action based at least in part on whether the cache access resulted in a cache hit or a cache miss and whether an eviction occurred in connection with the cache access;
  using the score corresponding to the action to update the actor network; and
  using the reward corresponding to the action to update the critic network,
  wherein the cache-management operation performed according to the action reduces accesses to the second-level auxiliary storage for a workload of cache accesses relative to a replacement policy that does not use the actor network and the critic network.

2. The system of claim 1, wherein the set of current states comprises values corresponding to respective ones of a set of state definitions, wherein each of the set of state definitions comprises an attribute associated with cache accesses within a sliding window of recent cache accesses at the cache.

3. The system of claim 1, wherein the set of current states is determined in response to an occurrence of a triggering event with respect to the cache.

4. The system of claim 1, wherein the action output by the actor network comprises outputting an instruction of when a data item is to be evicted from the cache.

5. The system of claim 1, wherein the action output by the actor network comprises outputting an instruction of a location in the cache to store a newly added data item.

6. The system of claim 1, wherein using the score corresponding to the action to update the actor network comprises performing backpropagation at the actor network based at least in part on the score.

7. The system of claim 1, wherein the reward corresponding to the action comprises a first reward value for a cache hit associated with the action performed at the cache or a second reward value for a cache miss associated with the action performed at the cache, wherein the first reward value is different from the second reward value.

8. The system of claim 1, wherein the operations further comprise:
  determining a set of next states with respect to the cache;
  generating a sample comprising the set of current states, the set of next states, the action, and the reward; and
  storing the sample in a storage that is configured to store a plurality of samples.

9. The system of claim 8, wherein the operations further comprise:
  selecting a subset of samples from the plurality of samples; and
  using the subset of samples to train the RL agent.

10. The system of claim 1, wherein the RL agent comprises a deep deterministic policy gradient (DDPG) RL agent.

11. A method, comprising:
  receiving, by one or more processors, a cache access requesting a current data item identified by a data item identifier from a cache;
  determining, by the one or more processors based at least in part on a plurality of historical cache accesses to the cache, a set of current states with respect to the cache;
  inputting, by the one or more processors, the set of current states into an actor network of a reinforcement learning (RL) agent to obtain an action output by the actor network, wherein the RL agent is configured to manage data stored at the cache, and the action specifies an eviction time for the current data item;
  inputting, by the one or more processors, the set of current states and the action into a critic network of the RL agent to obtain a score corresponding to the action from the critic network, for the RL agent to perform the action with respect to managing the data stored at the cache; and
  servicing the cache access according to the action by performing a cache-management operation that includes evicting the current data item from the cache when a system time reaches the eviction time and storing a replacement data item retrieved from a second-level auxiliary storage at a physical address in the cache determined by the action, thereby transforming a physical state of the cache;

determining a reward corresponding to the action based at least in part on whether the cache access resulted in a cache hit or a cache miss and whether an eviction occurred in connection with the cache access;

using, by the one or more processors, the score corresponding to the action to update the actor network; and using, by the one or more processors, the reward corresponding to the action to update the critic network.

12. The method of claim 11, wherein the set of current states comprises values corresponding to respective ones of a set of state definitions, wherein each of the set of state definitions comprises an attribute associated with cache accesses within a sliding window of recent cache accesses at the cache.

13. The method of claim 11, wherein the set of current states is determined in response to an occurrence of a triggering event with respect to the cache.

14. The method of claim 11, wherein the action output by the actor network comprises outputting an instruction of when a data item is to be evicted from the cache.

15. The method of claim 11, wherein the action output by the actor network comprises outputting an instruction of a location in the cache to store a newly added data item.

16. The method of claim 11, wherein using the score corresponding to the action to update the actor network comprises performing backpropagation at the actor network based at least in part on the score.

17. The method of claim 11, wherein the reward corresponding to the action comprises a first reward value for a cache hit associated with the action performed at the cache or a second reward value for a cache miss associated with the action performed at the cache, wherein the first reward value is different from the second reward value.

18. A non-transitory computer readable storage medium storing instructions that, when executed by a processor, cause the processor to perform operations comprising:

receiving a cache access requesting a current data item identified by a data item identifier from a cache;

determining, based at least in part on a plurality of historical cache accesses to the cache, a set of current states with respect to the cache;

inputting the set of current states into an actor network of a reinforcement learning (RL) agent to obtain an action output by the actor network, wherein the RL agent is configured to manage data stored at the cache, and the action specifies an eviction time for the current data item;

inputting the set of current states and the action into a critic network of the RL agent to obtain a score corresponding to the action from the critic network, for the RL agent to perform the action with respect to managing the data stored at the cache; and servicing the cache access according to the action by performing a cache-management operation that includes evicting the current data item from the cache when a system time reaches the eviction time and storing a replacement data item retrieved from a second-level auxiliary storage at a physical address in the cache determined by the action, thereby transforming a physical state of the cache;

determining a reward corresponding to the action based at least in part on whether the cache access resulted in a cache hit or a cache miss and whether an eviction occurred in connection with the cache access;

using the score corresponding to the action to update the actor network; and using the reward corresponding to the action to update the critic network.

* * * * *